United States Patent [19]

Potopinski

[11] 3,901,813

[45] Aug. 26, 1975

[54] LIGHT RESPONSIVE SWITCHING CIRCUIT

[75] Inventor: Michael A. Potopinski, Brookline, N.H.

[73] Assignee: Arthur D. Little, Inc., Cambridge, Mass.

[22] Filed: July 12, 1974

[21] Appl. No.: 488,114

[52] U.S. Cl. .................................. 250/209; 315/156

[51] Int. Cl.$^2$ .......................................... H01J 39/12

[58] Field of Search ........... 250/208, 209, 214, 206; 307/311; 317/124; 315/154, 155, 156, 158

[56] References Cited

UNITED STATES PATENTS

| | | | |
|---|---|---|---|
| 3,719,424 | 3/1973 | Weischedel | 250/209 |
| 3,727,100 | 4/1973 | Kuraishi et al. | 315/156 |
| 3,811,046 | 5/1974 | Levick | 250/206 |

*Primary Examiner*—James W. Lawrence
*Assistant Examiner*—D. C. Nelms
*Attorney, Agent, or Firm*—Weingarten, Maxham & Schurgin

[57] ABSTRACT

A light responsive switching circuit especially adapted for use in warning light apparatus such as highway markers. The circuitry includes first and second photosensors, one responsive to ambient light and one responsive to a headlight or other signal light source. A solid state switching circuit is enabled when ambient light is below a predetermined level and becomes disabled when the ambient light is at or above such level. In the enabled condition the circuit is switched in response to a signal light received by the second photosensor causing operation of an associated electronic flash circuit.

9 Claims, 3 Drawing Figures

FIG. 1

LIGHT RESPONSIVE SWITCHING CIRCUIT

FIELD OF THE INVENTION

This invention relates to light responsive electronic circuits and more particularly to switching circuits having multiple photosensors responsive to respective light sources.

BACKGROUND OF THE INVENTION

It is often useful to control an electronic switching circuit in response to different light sources. For example, a circuit may be operative only at night or under reduced ambient light conditions to turn on apparatus in response to an incident light beam. Such a circuit finds particular application in highway or construction markers wherein a warning light can be actuated in response to light from headlights of an approaching vehicle. Such circuits are generally known and include two photosensors each responsive to a respective source of illumination and which sensors must be selectively energized in an intended manner to actuate a switching device. Such known circuits are shown, for example, in U.S. Pat. Nos. 1,721,216, 3,083,300, 3,601,614, 3,089,065 and 3,160,757.

SUMMARY OF THE INVENTION

Briefly, the present invention provides light controlled circuitry especially adapted for use in warning light apparatus such as for highway and construction markers, and which includes electronic switching circuitry having first and second photosensors, one responsive to ambient light and one responsive to a headlight or other signal light source, the output being coupled to a photoflash circuit for providing a visual output indication. The circuit is relatively simple and inexpensive and is operative over a wide voltage range of typically 6–24 volts. The circuit is preferably installed behind a translucent shield such as the wall of a highway barrier, such that each photosensor receives diffused light through the shield and the circuit is less sensitive to dirt or the like on the shield since the light difference sensible by the plural photosensors remains approximately uniform.

DESCRIPTION OF THE DRAWINGS

The invention will be more fully understood from the following detailed description taken in conjunction with the accompanying drawings in which.

DETAILED DESCRIPTION OF THE INVENTION

Figure 1:
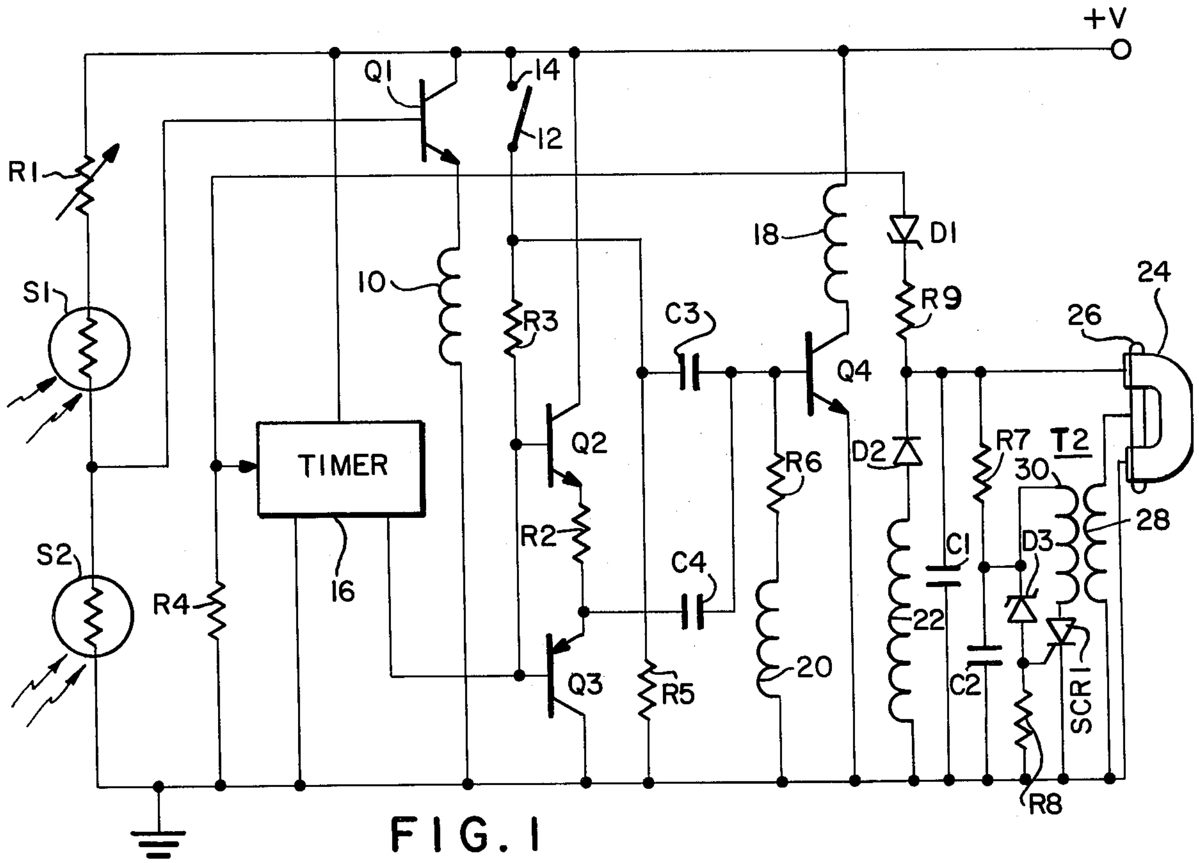
FIG. 1 is a schematic diagram of a preferred embodiment of the invention.

A circuit according to a preferred implementation of the invention is illustrated in FIG. 1 and includes first and second photosensors S1 and S2 serially interconnected from a source of reference potential, such as ground, by way of a variable resistor R1 to a source of positive potential +V. The junction between the photosensors is connected to the base of a transistor Q1, the collector of which is coupled to the potential source +V and the emitter of which is coupled via a relay coil 10 to ground. A pair of transistors Q2 and Q3 have the emitters thereof interconnected by a resistor R2 with the base of each being interconnected and also connected by a resistor R3 to one relay contact 12, the other contact 14 being connected to the source of positive potential. The relay contacts are operative in response to energization of relay coil 10. In alternative implementations, the relay can be replaced by other functionally equivalent switching devices.

The collector of transistor Q2 is connected to the source of positive potential, while the collector of transistor Q3 is connected to ground. The bases of transistors Q2 and Q3 are also coupled to the output terminal of a timer circuit 16, such as a National Semiconductor type 3905, the input of which is connected by a resistor R4 to ground and also connected to the anode of a zener diode D1. Power connections are also applied to the timer circuit 16. The emitter of transistor Q3 is coupled by a capacitor C4 to the base of a transistor Q4, the emitter of which is connected to ground and the collector of which is connected by way of winding 18 of transformer T1 to the positive potential source. The base of transistor Q4 is also coupled by a capacitor C3 to the relay contact 12 and to a resistor R5 connected to ground.

A winding 20 of transformer T1 is connected in series with a resistor R6, the series combination being connected between the base of transistor Q4 and ground. Transformer winding 22 is connected between ground and the anode of a diode D2, the cathode of which is connected via a resistor R9 to the cathode of zener diode D1, the cathode of diode D2 also being connected via a capacitor C1 to ground. The cathode of diode D2 is also connected to one electrode of a flash tube 24, the other electrode of which is connected to ground. The high voltage electrode 26 of the flash tube is connected to the secondary winding 28 of a transformer T2, the primary winding 30 of which is connected at one end via a controlled rectifier SCR1 to ground and at the other end via a resistor R7 to resistor R9. A zener diode D3 is coupled in the polarity shown to a resistor R8, this series combination being connected between ground and the high voltage end of transformer winding 30. The gate electrode of the controlled rectifier is connected to the junction between resistor R8 and zener diode D3. A capacitor C2 is connected between resistor R7 and ground.

The photosensors S1 and S2 are each typically cadmium sulfide photocells. The sensor S1 is arranged to receive ambient and signal light while the sensor S2 is arranged to receive ambient light. Below a predetermined ambient light level, the circuit of FIG. 1 is enabled for energization in response to a signal light received by sensor S1 to trigger flash tube 24 and to provide a visual output indication. The variable resistor R1 provides a sensitivity control for the light levels at which the circuit is operative. The timer circuit 16 controls the duration of circuit operation which can occur in response to even a momentary signal light reception by sensor S1 under appropriate ambient light conditions.

With ambient light present at or above a predetermined intensity level, the transistor Q1 is nonconducting by reason of the absence of a sufficient base drive signal. With transistor Q1 in a non-conducting state, no current flows through relay coil 10, relay contacts 12 and 14 remain open, and the remaining circuitry is inactive. The circuit in this mode of operation is not responsive to the presence of a signal light or any other light received by sensor S1 as the circuit remains disabled until the ambient light level is sufficiently low in order to permit energization of transistor Q1.

In the presence of an enabling sensor output signal produced in response to ambient light below a predetermined intensity, and a signal light received by sensor S1 sufficient to provide an intended output signal, the transistor Q1 is caused to conduct, in turn causing closure of relay contacts 12 and 14. Upon relay closure, a voltage is applied to capacitor C3 which charges to a voltage level sufficient to turn on transistor Q4. Transistor Q2 is also caused to conduct upon relay closure, in turn causing the charging of capacitor C4. The transistor Q4 is part of a blocking oscillator circuit and, upon conduction, the oscillator output causes charging of capacitor C1 and also causes charging of capacitor C2 at a slower rate determined by the time constant established essentially by resistor R7 and capacitor C2. The voltage provided by charged capacitor C1 is applied as a bias voltage to flash tube 24. When capacitor C2 charges to a predetermined level, zener diode D3 is triggered causing the firing of SCR1, in turn causing a high voltage pulse to be provided by transformer T2 to the triggering electrode 26 of flash tube 24 thereby producing flash operation.

When capacitor C1 has charged to a predetermined level zener diode D1 is triggered to cause provision of an input pulse to timer circuit 16 which after a selected time interval provides an output pulse to the base of transistor Q3 causing its conduction and in turn causing the discharge of capacitor C4. Transistor Q4 becomes nonconductive when capacitor C4 is sufficiently discharged and thus discontinues oscillator operation. The timing interval provided by timer circuit 16 determines the relative time at which transistor Q3 is turned off and thereby permits adjustment of the duration of oscillator operation. In certain instances the timer is not needed and can be replaced with a transistor switch to provide the switching function with little delay. When the flash tube 24 is triggered capacitor C1 is discharged, causing turnoff of diode D1.

Once the relay contacts 12 and 14 have closed to commence circuit operation, such operation continues even though the relay contacts thereafter reopen. Thus, even a momentary application of signal light to sensor S1 during a time when ambient light levels are enabling the circuit, is sufficient to trigger operation to provide a flash indication. Upon commencement of circuit operation by closure of the relay contacts, the circuit will continue to operate to provide repetitive flash outputs even if a failure occurs in the input portion of the circuit, such as a failure of timer circuit 16 or of the input photosensors. In addition, even if the circuit has not started its operating cycle the shortcircuiting of photosensor S1 and the open circuiting of photosensor S2 will cause closure of the relay contacts to commence circuit operation.

The circuit requires little operating power and it will be appreciated that the circuit is nonenergized when the ambient light level is above a predetermined level and even below such ambient light level, remains nonenergized except during receipt of a signal light of predetermined intensity. The illustrated circuit is operative with a 12 volt battery having a capacity of 6 amphours. The illustrative circuit is, however, operative over a wide voltage range, typically 6 to 24 volts, such that proper circuit operation is achieved even under degraded battery conditions.

Figure 2:
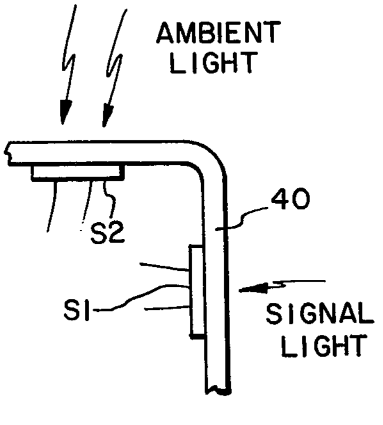
FIG. 2 is a diagrammatic representation of a preferred disposition of the novel circuit.

The photosensors are disposed in respective positions for receipt of illumination by respective light sources. Preferably the photosensors are disposed behind a translucent shield, as illustrated in FIG. 2. The photosensor S1 is disposed behind a shield 40 to receive substantially horizontally directed light, while the photosensor S2 is disposed behind shield 40 for receipt of vertically directed light. The translucent shield also provides a means of biasing the signal photosensor. A portion of the ambient light received by sensor S2 is coupled by means of shield 40 to the sensor S1 for biasing thereof.

Figure 3:
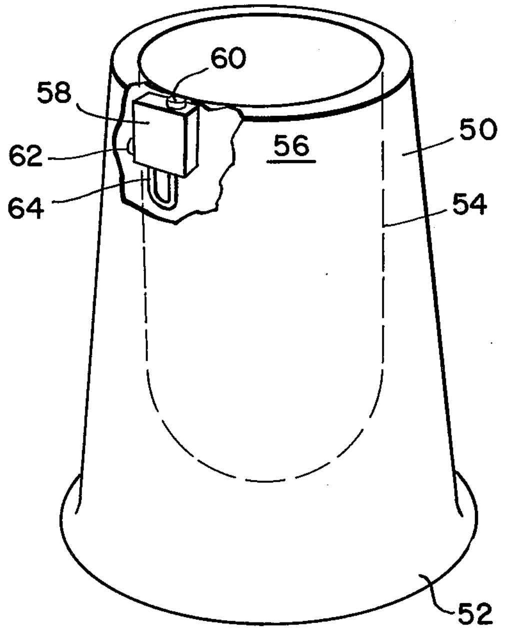
FIG. 3 is a diagrammatic representation of the invention as installed in a highway marker.

The circuit described hereinabove is adapted for use in a highway or construction marker which remains nonilluminated during daylight hours and which during nighttime hours is illuminated only in response to reception of illumination such as from approaching vehicle headlights. The marker is shown in typical implementation in FIG. 3 and is in the form of a translucent barrel 50 of generally truncated conical form and having an outwardly flaired base portion 52. The barrel is of a translucent plastic or other suitable material and has a spaced inner wall 54 defining a chamber 56 which can be filled with sand or other ballast material for stability during use. The novel circuit is contained within a small housing 58 having an upwardly facing aperture 60 with respect to which the ambient light photosensor is disposed, and a horizontally directed aperture 62 in association with which the signal light photosensor is disposed. A flash tube 64 is affixed to and depends from the bottom of housing 58.

The housing is contained between the confronting walls of barrel 50 near the top thereof with the photosensors both arranged to receive diffused light as transmitted by the translucent barrel material. The photosensors and the entire circuit are isolated from sources of contamination such as dust, dirt and the like. Any such contamination present on the barrel surfaces does not usually affect circuit operation since the differential light intensities sensed by the two photosensors remain approximately the same whether or not contamination is present provided that ambient light of an intensity above the threshold for circuit operation can reach sensor S2 and sufficient signal light can reach sensor S1. Upon triggering of the flash tube, light is diffused throughout the translucent barrel structure causing illumination of the entire marker or a major portion thereof to present a vivid and easily noticed visual indication. Rather than a constricted light burst as seen from the flash tube itself, a relatively large area burst of illumination is provided by the embodiment of FIG. 3.

It will be appreciated that the novel circuit can be variously constructed to suit particular operating requirements and can be implemented for use with different respective light sources and for other than highway markers. Accordingly, it is not intended to limit the invention by what has been particularly shown and described except as indicated in the appended claims.

What is claimed is:

1. A light responsive switching circuit comprising:

first and second photosensors connected in series and each disposed to receive light from a respective source;

said first photosensor being operative to provide a switching signal in response to received light having an intensity above a predetermined level, said second photosensor being operative to provide an enable signal in response to received light having an intensity below a predetermined level;

a first transistor switch coupled to said first and second photosensors and being switchable to a conducting state in response to said enable signal from said second photosensor and said switching signal from said first photosensor;

switch means operative when said first transistor switch is in a conducting state to provide a conduction path;

a second transistor switch conductive during conductive operation of said switch means and providing a charging current;

charge storage means operative in response to said charging current to store at least one selected charge;

pulse generating means operative in response to a predetermined voltage of said charge storage means to provide at least one output pulse; and output means including a flash tube operative in response to said at least one output pulse to provide a burst of illumination.

2. The circuit according to claim 1 wherein said first and second photosensors are disposed on the opposite side of a translucent shield from the side upon which light is received, said shield transmitting diffused light to said photosensors.

3. The circuit according to claim 1 including a translucent shield disposed between said first and second photosensors and said source of light and operative to transmit a portion of light from said second source to said first photosensor for biasing thereof.

4. The circuit according to claim 1 wherein said switch means includes a relay switch having a relay coil and a pair of switch contacts.

5. The circuit according to claim 4 wherein said first transistor switch includes a base electrode coupled to the junction between said first and second photosensors, a collector electrode coupled to said first photosensor and an emitter electrode coupled via said relay means to a source of reference potential; and wherein said second transistor switch includes a base electrode coupled to said relay switch and a collector electrode coupled to a source of operating potential.

6. The circuit according to claim 4 further including a third transistor switch conductive at a predetermined voltage level of said charge storage means and operative to cause turnoff of said pulse generating means.

7. The circuit according to claim 6 wherein said output means includes:

a zener diode operative to trigger at a predetermined voltage level of said charge storage means;

a controlled rectifier triggerable in response to triggering of said zener diode;

a transformer having its input winding coupled to said controlled rectifier and its output winding coupled to said flash tube and operative in response to triggering of said controlled rectifier to provide a high voltage pulse to said flash tube for the triggering thereof.

8. The circuit according to claim 7 wherein said charge storage means includes:

first storage capacitor means operative to charge to a predetermined level for biasing of said flash tube; and second storage capacitor means operative to charge to a predetermined level for triggering of said zener diode.

9. The circuit according to claim 8 further including timer means operative in response to triggering of said zener diode to provide a timing interval at the end of which charging of said charge storage means is discontinued.

* * * * *